United States Patent [19]

Naiman

[11] Patent Number: 4,491,651

[45] Date of Patent: Jan. 1, 1985

[54] ANTISTATS CONTAINING ACRYLONITRILE COPOLYMERS AND POLYAMINES

[75] Inventor: Michael I. Naiman, St. Louis, Mo.

[73] Assignee: Petrolite Corporation, St. Louis, Mo.

[21] Appl. No.: 378,541

[22] Filed: May 17, 1982

[51] Int. Cl.$^3$ .................. C08L 33/20; C08L 39/04; C08L 79/02
[52] U.S. Cl. .................. 525/187; 525/205; 525/203; 525/186; 44/62
[58] Field of Search ............. 525/186, 187, 205, 203

[56] References Cited

U.S. PATENT DOCUMENTS

| | | | |
|---|---|---|---|
| 3,496,249 | 2/1970 | Hitzler et al. | 525/205 |
| 3,676,404 | 7/1972 | Nield | 525/205 |
| 3,677,725 | 7/1972 | Andress | 44/62 |
| 3,720,733 | 3/1973 | Rinkler et al. | 525/205 |
| 4,259,087 | 3/1981 | Naiman et al. | 44/62 |

*Primary Examiner*—Carman J. Seccuro
*Attorney, Agent, or Firm*—Sidney B. Ring; Leon Zitver

[57] ABSTRACT

This invention relates to compositions comprising (1) acrylic-type ester-acrylonitrile copolymers and (2) polymeric polyamines; and to such compositions in combination with organic liquids such as hydrocarbon fluids in which such compositions are effective as antistatic agents.

12 Claims, No Drawings

ANTISTATS CONTAINING ACRYLONITRILE COPOLYMERS AND POLYAMINES

This invention relates to organic liquids having desirable anti-static properties, and, in one of its aspects, relates more particularly to organic liquid compositions in the form of volatile organic liquids such as hydrocarbon fuels or solvents which possess low electrical conductivity which, when they accumulate electrostatic charges, may give rise to the hazards of ignition or explosion. Still more particularly in this aspect, the invention relates to the improvement of such organic liquids by incorporating therein, additives which are effective in increasing the electrical conductivity of such liquids to the extent that accumulation of electrostatic charges, with attendant danger of ignition or explosion, is significantly minimized, particularly in the handling, transportation or treatment of such liquids.

The low electrical conductivity of many volatile organic liquid compositions has presented the problem of controlling static buildup, particularly during handling and transportation, for the purpose of insuring safe and effective distribution without the concomitant danger of ignition or explosion. For example, volatile organic liquids such as hydrocarbon fuels (e.g., gasoline, jet fuels, turbine fuels and the like), or light hydrocarbon oils employed for such purposes as solvents or cleaning fluids for textiles, possess a very low degree of electrical conductivity. In the use of such fluids, electrostatic charges, which may be generated by handling, operation or other means, tend to form on the surface, and may result in sparks, thus resulting in ignition or explosion. These hazards may be encountered merely in the handling or transportation of such organic liquids and even in operations, such as centrifuging, in which a solid is separated from a volatile liquid, during which electrostatic charges can accumulate.

Various materials have heretofore been proposed for incorporation into such organic liquid compositions for increasing their electrical conductivity and thus reduce the aforementioned dangers of ignition and explosion.

The following are examples of patents which describe antistatic agents employed in fuels:

(1) α-olefin-sulfone copolymers
U.S. Pat. No. 3,578,421
U.S. Pat. No. 3,677,724
U.S. Pat. No. 3,807,977
U.S. Pat. No. 3,811,848
U.S. Pat. No. 3,917,466

(2) α-olefin-maleic anhydride copolymers
U.S. Pat. No. 3,677,725

(3) amines and methyl vinyl ether-maleic anhydride copolymers
U.S. Pat. No. 3,578,421

(4) aliphatic amines-fluorinated Polyolefins
U.S. Pat. No. 3,652,238

(5) chromium salts and amine phosphates
U.S. Pat. No. 3,758,283.

U.S. Pat. No. 4,259,087 described and claims antistats containing acrylonitrile copolymers and polyamines and the use thereof.

In Ser. No. 810,342 filed June 27, 1977 there is described and claimed α-olefin-acrylonitrile copolymers which are useful as antistatic agents, particularly as antistatic agents in organic fluids such as in hydrocarbon fuels.

I have now discovered that when copolymers of an acrylate-type ester and acrylonitrile (ACN) are employed in conjunction with polymeric amines, synergistically effective agents are obtained which are effective as antistatic agents in organic fluids such as hydrocarbon fluids.

The copolymers may be expressed by the idealized formula

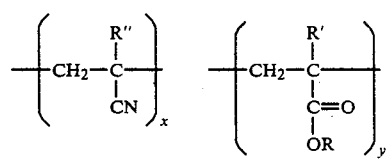

where the molar ratio of ACN to Ester, i.e. x to y is from about 10:1 to 1:10, such as from about 8:1 to 1:5, for example from about 6:1 to 1:5, but preferably from about 5:1 to 1:1; the R' and R" which may be the same or different are hydrogen or lower alkyl such as methyl and R is an alkyl group having from about 1 to 20 or more carbons, such as from about 2 to 20 carbons, for example from about 2 to 18, but preferably from about 6 to 14.

The molecular weight of the copolymer can vary widely, such as from about 1000 to 100,000 or more, for example from about 1,500 to 50,000 but preferably from about 2,000 to 30,000.

The acrylic-type ester employed as a comonomer has the general formula

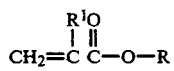

where $R^1$ is hydrogen or alkyl group such as lower alkyl, methyl, ethyl, propyl, butyl, etc.; R is the moiety derived from an alcohol ROH where R is radical having from about 1 to 20 carbons or more, such as from about 2 to 20 carbons, for example from about 2 to 18 carbons but preferably from about 6 to 14 carbons. The alcohol can also be cycloalkyl, for example cyclohexyl, alkylcyclohexyl, etc.; aryl, e.g. phenols and alkylphenols, alkaryl, for example benzyl, alkylbenzyl.

The particular length of the radical employed will vary depending on the comonomer employed, the ratio thereof, the particular system in which it is employed, etc.

More than one acrylic-type ester may be employed in preparing the copolymer.

The other component of the copolymer is acrylonitrile or a derivative thereof such as

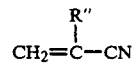

where R" is H or an alkyl such as methyl, etc.

The copolymers of Ser. No. 810,342 are prepared by complexing the acrylonitrile with a Lewis acid such as $AlCl_3$, $ZnCl_2$, $AlR_nCl_{3-n}$ and then polymerizing the complexed material with a terminal olefin using a free radical initiator. These techniques are well known to those skilled in the art and may be prepared by a variety of known methods such as those described by Gaylord et al, *Macromolecules,* Vol. 2, page 442, et seq. 1969, and Ikegami et al., *Journal of Polymer Science*, Part A-5, Vol. 8, pages 195–208 (1970). The ratio of nitrile to olefin controlled by the ratio of nitrile to complexing agent employed. With ratios of 1–1 to 2–1 the polymers approach an alternating system. With ratios of 2–1 to 10–1 the polymers closely resemble the feed ratios employed, while higher than 10–1 ratios give less effective products. If desired, the above polymers may be also prepared without the use of Lewis acids.

The following examples are presented by way of illustration and not of limitation.

EXAMPLE 1

In a three necked flask equipped with stirrer, thermometer and nitrogen purge were placed 200 mls of xylene, 32.4 gms (0.1M) of stearyl methacrylate and 21.2 gms of acrylonitrile (0.4M). To this was added 0.5 gms of benzoyl peroxide and the reaction was heated to 75° for 24 hours. The reaction product is used as is for blending with polyamines and determining the conductivity in kerosene.

EXAMPLES 2 AND 3

The above procedure was repeated with 0.1M of lauryl methacrylate (Ex. 2) and 0.05M of butyl methacrylate (Ex. 3).

In the above examples the molar ratio of acrylic-type ester to ACN is as follows.

(Ex. 1) 1:4 (Ex. 2) 1:4 (Ex. 3) 1:8.

A wide variety of polymeric polyamines can be employed in conjunction with the copolymers to yield the compositions of this invention. The polymeric polyamine should be soluble in the system in which it is employed and is effective as an antistatic agent in combination with said α-olefin-acrylonitrile copolymer.

One polyamine component of the antistatic composition of the present invention is a polymeric reaction product of epichlorohydrin with an aliphatic primary monoamine or N-aliphatic hydrocarbyl alkylene diamine. The polymeric reaction products are prepared by heating an amine with epichlorohydrin in the molar proportions of from 1:1–1:5 in the temperature range of 50° to 100° C. Generally, with aliphatic monoamines, $R^1NH_2$, the molar ratio is about 1:1. The initial reaction product is believed to be an addition product as illustrated below with a primary monoamine, $R^1NH_2$.

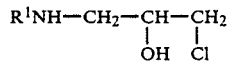 (I)

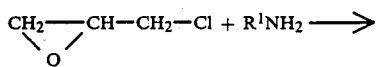

The aminochlorohydrin (I) upon reaction with an inorganic base then forms an aminoepoxide.

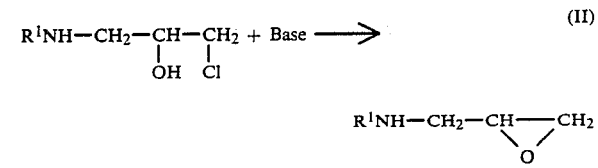

The aminoepoxide (II), which contains a reactive epoxide group and a reactive amino-hydrogen, undergoes polymerization to provide a polymeric material containing several amino groups. The ratio of epichlorohydrin to amine and the reaction temperature used are such that the polymeric reaction product contains from 2 to 20 recurring units derived from the aminoepoxide represented by II.

The polymeric reaction product derived from epichlorohydrin and an aliphatic primary monoamine as defined is represented by subgeneric formula (A),

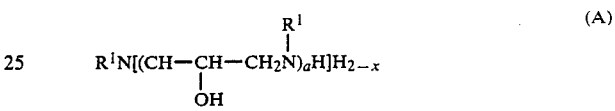 (A)

where a is an integer from 2 to 20 and x is an integer of 1 to 2.

The aliphatic primary monoamines that can be used to prepare the polymeric reaction products with epichlorohydrin can be straight chain or branched chain and include, inter alia, octylamine, nonylamine, decylamine, undecylamine, dodecylamine, tridecylamine, tetradecylamine, pentadecylamine, hexadecylamine, heptadecylamine, octadecylamine, nonadecylamine, eicosylamine, heneicosylamine, docosylamine, tricosylamine, tetracosylamine and the corresponding alkenyl analogs. The aliphatic primary amine should have at least about 8 carbon atoms, preferably about 12 to 18 carbon atoms to provide polymeric reaction products of sufficient solubility in hydrocarbon fuels. While aliphatic primary amines containing more than about 24 carbon atoms are useful, such amines are of limited availability.

Mixtures of aliphatic primary amines can also be used, and are preferred since mixtures of primary amines derived from tall oil, tallow, soybean oil, coconut oil, cotton seed oil and other oils of vegetable and animal origin are commercially available and at lower cost than individual amines. The above mixtures of amines generally contain alkyl and alkenyl amines of from about 12 to 18 carbon atoms, although sometimes an individual amine mixture, depending upon the source, contains small amounts of primary amines having fewer or more carbon atoms. A preferred example of a commercially available mixture of primary monoamines is hydrogenated tallow amine which contains predominantly hexadecyl- and octadecylamines with smaller amounts of tetradecylamine.

When the amine reacted with epichlorohydrin is an N-hydrocarbylalkylenediamine as defined, the polymeric reaction is represented by subgeneric formula (B),

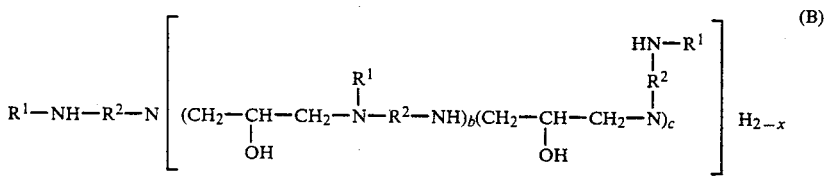

where $R^1$ is an aliphatic hydrocarbyl group of 8 to 24 carbon atoms, $R^2$ is an alkylene group of 2 to 6 carbon atoms, b and c are integers of 0 to 20 and b+c is an integer of 2 to 20 and x is 1 to 2.

In the reaction of epichlorohydrin with an N-aliphatic hydrocarbylalkylenediamine, it is believed (because of the known greater reactivity of primary amino hydrogen over secondary amino hydrogen) that the initially formed aminochlorohydrin is of the formula

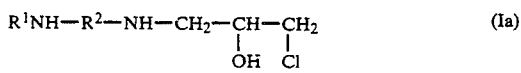

and the subsequently formed aminoepoxide is of the formula

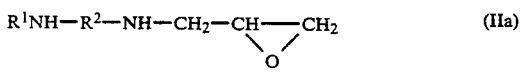

When IIa undergoes further condensation, the recurring units in the product may be

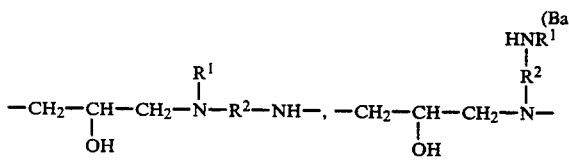

or both, since (IIa) contains two reactive secondary aminohydrogens. Thus, in subgeneric formula (Ba), above, b is from 0 to 20, c is from 0 to 20 and b+c is from 2 to 20.

Illustrative examples of useful N-aliphatic hydrocarbyl alkylene diamines include N-octyl, N-nonyl, N-decyl, N-undecyl, N-dodecyl, N-tridecyl, N-tetradecyl, N-pentadecyl, N-hexadecyl, N-heptadecyl, N-octadecyl, N-nonadecyl, N-eicosyl, N-uneicosyl, N-docosyl, N-tricosyl, N-tetracosyl, as well as the corresponding N-alkenyl derivatives of ethylenediamine, propylenediamine, butylenediamine, pentylenediamine and hexylenediamine. The preferred N-aliphatic hydrocarbylalkylenediamine is N-aliphatic hydrocarbyl-1,3-propylenediamine. The N-aliphatic hydrocarbyl-1,3-propylenediamines are commercially available and are readily prepared from aliphatic primary monoamines such as those described above by cyanoethylation with acrylonitrile and hydrogenation of the cyanoethylated amine. Mixtures of N-aliphatic hydrocarbyl-1,3-propylenediamines can also be advantageously used. The preferred mixture is N-tallow-1,3-propylenediamine which is commercially available as "Duomeen T" wherein "tallow" represents predominantly mixtures of alkyl and alkenyl groups of 16 to 18 carbon atoms which can contain small amounts of alkyl and alkenyl groups of 14 carbon atoms.

The reaction between the amines (as defined) and epichlorohydrin is advantageously carried out in the presence of a solvent such as benzene, toluene or xylene which can also contain some hydroxylic component such as ethanol, propanol, butanol and the like. After the initial reaction between the amine and epichlorohydrin to form an amino-chlorohydrin intermediate as illustrated above by Products I and Ia, the reaction mass is treated with a strong inorganic base, such as sodium, potassium or lithium hydroxide, to form an aminoepoxide as represented by Products II and IIa above, which under continued heating undergoes polymerization to yield the desired product represented above by the generic formula and subgenerics A and B. Inorganic chloride formed in the reaction is removed by filtration. The solvent used to facilitate the reaction can be removed if desired, e.g., by distillation, but generally it is more convenient to use the polymeric polyamine as a solution.

The above-described reactions of epichlorohydrin with amines to form polymeric products are well-known and find extensive use in epoxide resin technology (cf. "Epoxy Resins", Henry Lee and Kris Neville, The McGraw-Hill Book Co., 1957). The polymeric reaction products of epichlorohydrin and amines are complex mixtures but it is believed that the above formulas of the polymeric polyamines fairly represent the composition and structures that are obtained.

Polymeric polyamines as described above are commercially available. One such product which is believed to be a polymeric reaction product of N-tallow-1,3-propylenediamine with epichlorohydrin is "Polyflo 130" sold by Universal Oil Co. and is suitable for use.

The following examples illustrate the preparation of such polymeric polyamines.

EXAMPLE A1

Into a reaction flask equipped with a stirrer, a reflux condenser, a thermometer, and an addition funnel 46.3 g. (0.5 mole) of epichlorohydrin, 100 ml. of xylene and 50 ml. of isopropanol were added. The mixture was heated to 55° to 60° C. and 64 g. (0.25 mole) of hydrogenated tallowamine in 80 ml. of xylene was added over a period of about 20 minutes. The reaction mixture was kept at 55° to 60° C. for 2.5 hours and then an additional 64 g. (0.25 mole) of hydrogenated tallowamine in 80 ml. of xylene was added. The temperature was then raised to 80° C. and the reaction mixture was kept at 80° C. for 2 hours. Sodium hydroxide (pellets), 10 g., were then added, and the temperature was raised to 88° C. After about 2 hours at 88° C., an additional 10 g. of sodium hydroxide (pellets) was added and the reaction continued for 1.5 hours. The reaction mixture was allowed to cool to room temperature and filtered to provide a yellow slightly viscous solution. Removal of the solvents at reduced pressures provided a yellow waxy polymeric polyamine which was free of tallowamine (as indicated by thin layer chromatography) and which showed the presence of hydroxyl groups (by infrared spectroscopy).

EXAMPLE A2

Into a reaction flask equipped with a stirrer, a reflux condenser, a thermometer and an addition funnel, and containing 110 g. (0.33 mole) of N-tallow-1,3-diaminopropane ("Duomeen T"), 110 ml. of xylene and 30 ml. of isopropanol heated at 55° to 60° C., was added 31 g. (0.33 mole) of epichlorohydrin in 75 ml. of xylene. The reaction mixture was kept at 55° to 60° C. for 1.5 hours. The temperature was then raised to 80° C. and held at 80° C. for 2.5 hours. Solid sodium hydroxide, 13.3 g., was then added, the temperature raised to 90° C. and kept at 90° C. for 2 hours. The reaction mixture was cooled to room temperature, and filtered to provide an amber solution. Removal of the solvents by distillation at reduced pressures provided polymeric polyamines as a viscous polymer.

EXAMPLE A3

Using the same procedure as described in Preparation B2, polymeric polyamine was prepared from epichlorohydrin and N-tallow-1,3-diaminopropane wherein the molar ratio of epichlorohydrin to N-tallow-1,3-diaminopropane was 1.5:1.

Another class of polymeric polyamines comprises α-olefin-maleimides which are derived from reacting α-olefin-maleic anhydride copolymers with polyamines to form the α-olefin-maleimides.

α-olefin/maleic anhydride copolymers, which are well known, are prepared by copolymerizing substantially equimolar amounts of an α-olefin and maleic anhydride. Preferred α-olefins contain between 2 to 28 carbon atoms per molecule, α-olefins containing a greater number of carbon atoms can also be employed, for example, having as high as about 50 carbon atoms; mixtures of α-olefins can also be employed.

The following is an idealized formula of α-olefins:

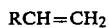

where R is alkyl, for example having from about 4 to 50 or more carbons. They may be linear or branched.

The α-olefins employed in preparing the acrylonitrile copolymers can also be employed in preparing the α-olefins/maleic anhydride copolymers. These α-olefins are illustrated as follows.

The olefins useful for the preparation of the polymeric polyamines are 1-alkenes of about 6 to 24 carbon atoms. The 1-alkenes are generally available commercially as pure or mixed olefins from petroleum cracking process or from the polymerization of ethylene to a low degree. The useful 1-alkenes include for example 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonodecene, 1-eicosene, 1-heneicosene, 1-ducosene, 1-tricosene and 1-tetracosene. While the normal straight chain 1-alkenes are preferred, it is understood that 1-alkenes containing branched chains are also useful. It is also understood that a mixture of 1-alkenes may be used and may often be desirable since a mixture of 1-alkenes are often obtainable at a lower cost than are pure olefins.

Several of the aforementioned α-olefin-maleic anhydride copolymers are commercially available materials and are well known in the art and are readily prepared by heating maleic anhydride and one or more α-olefins, preferably in the presence of a peroxidic catalyst. Their preparation is shown for example in U.S. Pat. Nos. 3,560,456; 3,677,725; 3,729,451 and 3,729,529. These polymers vary in molecular weight from a few hundred to a few thousand. These polymers are described in the literature as linear and having the following formula

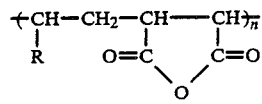

wherein n is an integer greater than 1 and where R is the moiety of the α-olefin such as alkyl, etc.

A wide variety of diamines of the type described herein can be employed to react with the α-olefin-maleic anhydride copolymers to form imides. The diamines have the following general formula

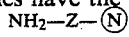

where Z is group whose backbone is primarily alkylene and Ⓝ is a blocked or sterically hindered group, i.e., will not react under conditions of reaction. The alkylene backbone has from about 2 to 10 or more carbons such as from about 2 to 12 carbons but preferably from about 3 to 5 carbons. The alkylene may or may not be a tertiary group such as

where R is alkyl, cycloalkyl, etc., by hydrogen.

The preferred amines are those described in Ser. No. 597,564 filed July 21, 1975 which have the general formula

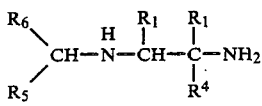

where the R groups, which may be the same or different, are hydrogen or a substituted group such as alkyl, aryl, cycloalkyl, aralkyl, alkaryl, heterocyclic, substituted derivatives thereof, etc. In addition the R groups may be joined in a cyclic configuration.

Typical examples are the following:

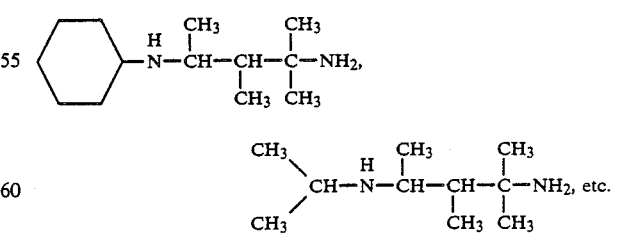

Unless the reaction between the α-olefin-maleic copolymer is carefully carried out or carried out in a specific manner cross-linking or gelling may occur. In order to prevent cross-linking or gelling we carry out the reaction in accord with the following equations:

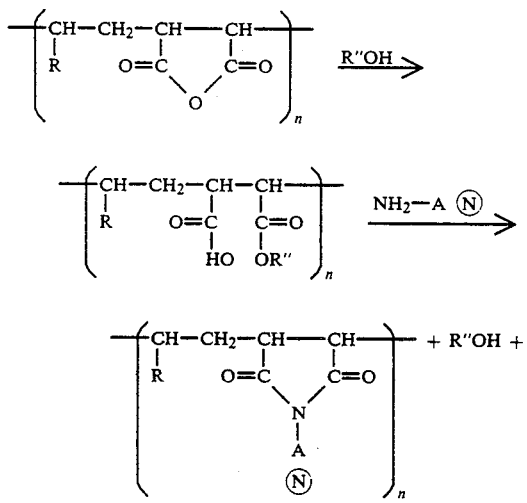

One equivalent of the α-olefin-maleic anhydride copolymer was heated to reflux with 20 weight % amyl alcohol and 50 weight % xylene for about 1 hour and then cooled to 100° to 110° C. To this solution was added 1.01 mole of amine. The reaction mixture thickened quickly and then thinned as the temperature was raised to reflux. Water and alcohol were azeotropically distilled off until the reaction was completed.

The most preferred (Olefin-N-alkyl maleimide) copolymer is (octadecane-N-(N-cyclohexyl 2,4-diamino-2-methyl pentane)maleimide) copolymer, having the following unit:

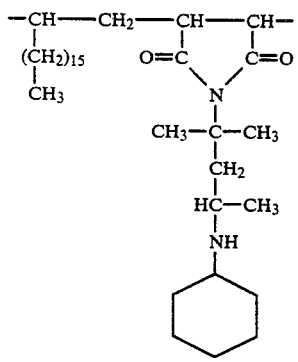

A number of N-alkyl 1,3-propylene diamines are suitable for this invention. Illustrative examples of these diamines include, dimethylaminopropylamine, N-octyl, N-nonyl, N-decyl and N-dodecyl derivatives of propylene-diamine, N-isopropyl-2,4-diamino-2-methyl pentane and N-cyclohexyl-2,4-diamino-2-methyl pentane. The preferred diamine is N-cyclohexyl-2,4-diamino-2-methyl pentane, having the formula,

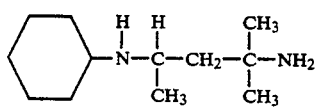

The α-olefin-maleimide copolymers are compositions ideally presented as containing the following polymer unit:

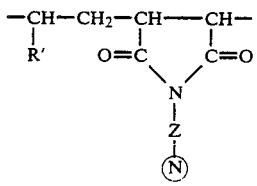

where R' is the moiety of the α-olefin such as alkyl, etc. and Z represents the moiety of the dangling group having a terminal amino group represented by Ⓝ.

Thus, the amine employed to form the imide is a polyamine, preferably a diamine, capable of reacting with the maleic group to form an imide while retaining a dangling terminal amino group. The preferred composition is where the terminal amino group is sterically hindered.

Although the basic polymer contains the following polymeric unit:

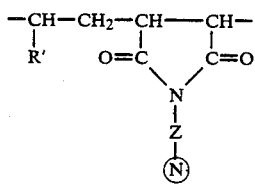

the polymer may contain other copolymeric units which may contain acid, ester, and/or amide groups, for example, the following copolymeric units

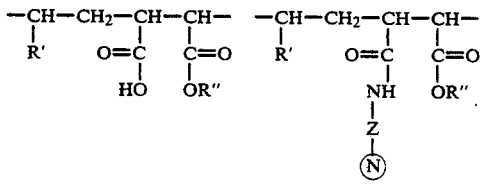

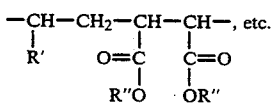
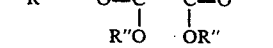

where R' is alkyl, etc. and R" is an alcohol moiety. In certain systems these other polymeric units yield improved properties.

Thus, the amine employed to form the imide is a polyamine, preferably a diamine, capable of reacting with the maleic group to form an imide while retaining a dangling terminal amino group. The preferred composition is where the terminal amino group is sterically hindered.

Thus, although the basic polymer (showing the preferred diamine by way of illustration) contains the following polymeric units

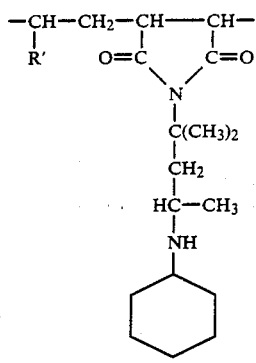

the polymer may contain other copolymeric units which may contain acid, ester, and/or amide groups, for example, the following copolymeric units:

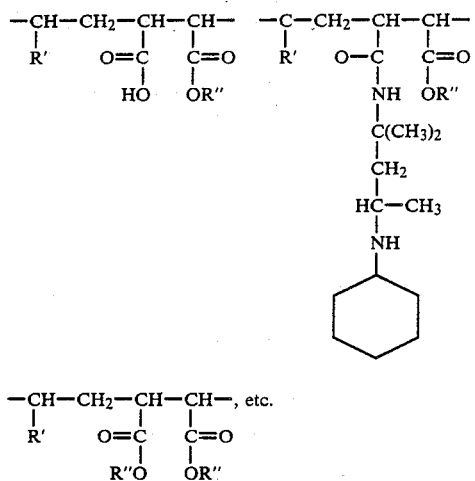

where R' is alkyl, etc. and where R" is an alcohol moiety. In certain systems these other polymeric units yield improved properties.

The following examples are presented for purposes of illustration and not of limitation.

EXAMPLE B1

This example describes the preparation of the (tetradecene-maleic anhydride) copolymer.

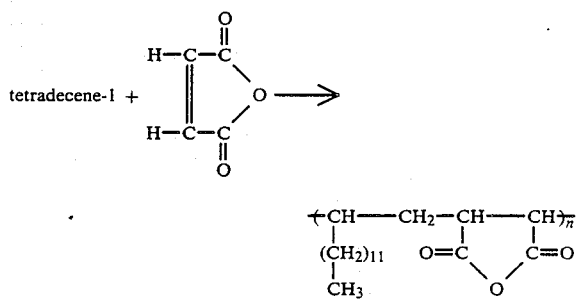

A 1-liter resin kettle equipped with a stirrer, reflux condenser, a thermometer and gas inlet tube was swept with dry nitrogen. To the flask were added 55 g. (0.56 m) maleic anhydride, 25 gm. chlorobenzene, 110 gm. Shell Solvent 71, and 138 gm. tetradecene-1. The reaction was then heated to about 60° C. until the maleic anhydride was all in solution. The pot temperature is then raised to 130° C. and 0.7 gm. di-t-butyl peroxide is added. The temperature is then maintained between 135°–140° C. for 3 hours, during which time the reaction mass becomes viscous. An additional 1.0 g. di-t-butyl peroxide was added and heating was continued for 8 hours. The mixture is then cooled to 100° C. and a sample analysis was taken for distillation and nonvolatile analysis. Commercial quantities of several (Olefin-maleic anhydride) copolymers are also available, for example, *Gulf's polyanhydride resins, PA-10, PA-14 and PA-18.

*Gulf Oil Chemicals Company.

EXAMPLES B2–4

Using the same procedure described in example B1, other 1-olefin-maleic anhydride copolymers were prepared. Some of these are listed below:

| Example | 1-olefin-used |
|---|---|
| B2 | 1-decene |
| B3 | 1-dodecene |
| B4 | 1-octadecene |

EXAMPLE B5

This example describes the preparation of [tetradecene-N(N-cyclohexyl-2,4-diamino-2-methyl pentane)-maleimide]copolymer. To a 500 ml. flask equipped with stirrer, thermometer and a Dean Stark condenser for water removal were added 29.4 g. (0.1 m) (tetradecene-maleic anhydride) copolymer (Example 1), 10 cc. of amyl alcohol and 100 cc. xylene. The mixture was stirred at 120°–140° C. for 0.75 hour. To this solution was added 19.8 g. (0.1 m.) N-cyclohexyl-2,4-diamino-2-methyl pentane. The reaction mixture thickened quickly and then thinned as the temperature was raised to reflux. Water and amyl alcohol were azeotropically distilled off. At the end of 5 hours 90–95% of the theoretical amount of water was collected (1.7 cc.). The mixture was cooled to 50° C. and the clear homogenous solution was diluted with xylene to make a 20% active solution. The in-situ esterification step with amyl alcohol as solvent and reactant was employed for the imide synthesis to eliminate and reduce possible cross-linking with the difunctional amine and to improve the homogeneity in the presence of the aromatic solvent. In the absence of the esterifying alcohol the addition of the diamine may give rise to severe cross-linking, which causes the reaction mixture to thicken and sometimes gel.

EXAMPLE B6

This example describes the preparation of [octadecene-N(N-cyclohexyl-2,4-diamino-2-methyl pentane)-maleimide]copolymer. The same procedure was employed as described in Example B5 using 35 g. (0.1 m) octadecene-maleic anhydride copolymer (Example B4).

The ratio of the synergistic blend may vary widely depending on the particular system in which it is employed, the conditions of use, the specific components of the blend, etc. In general, the ratio of (1) acrylic-type ester acrylonitrile polymer to (2) polymeric polyamine may vary from about 1 to 99 to 1, such as about 10 to 90 to 90 to 10, for example from about 25 to 75 to 75 to 25, but preferably from 40 to 60 to 60 to 40 with an optimum of about 50 to 50±5.

In accordance with the present invention improved liquid hydrocarbon compositions are provided containing an amount sufficient to impart antistatic properties to the antistatic agents of this invention.

In general, the present invention, in its preferred applications contemplates organic liquid compositions which normally are capable of accumulating a relatively large degree of electrostatic charge resulting in the aforementioned hazards of ignition and explosion, having incorporated therein a small amount of the aforementioned reaction product, usually from about 0.1 to about 200, and preferably from about 1 to about 10 pounds, per thousand barrels of the total volume of the liquid composition, i.e., from about 0.1 to 100 ppm, such as from about 0.2 to 50 ppm, but preferably from about 0.5 to 10 ppm.

A field of specific applicability of the present invention is in the improvement of organic liquid compositions in the form of petroleum distillate fuel oils having an initial boiling point from about 75° F. to about 135° F. and an end boiling point from about 250° F. to about 1000° F. It should be noted, in this respect, that the term "distillate fuel oils" is not intended to be restricted to straight-run distillate fractions. These distillate fuel oils can be straight-run distillate fuel oils, catalytically or thermally cracked (including hydrocracked) distillate fuel oils, or mixtures of straight-run distillate fuel oils, naphthas and the like, with cracked distillate stocks. Moreover, such fuel oils can be treated in accordance with well-known commercial methods, such as acid or caustic treatment, hydrogenation, solvent refining, clay treatment, and the like.

The distillate fuel oils are characterized by their relatively low viscosity, pour point and the like. The principal property which characterized these contemplated hydrocarbons, however, is their distillation range. As hereinbefore indicated, this range will lie between about 75° F. and about 1000° F. Obviously, the distillation range of each individual fuel oil will cover a narrower boiling range, falling nevertheless, within the above-specified limits. Likewise, each fuel oil will boil substantially, continuously, throughout its distillation range.

Particularly contemplated among the fuel oils are Nos. 1, 2 and 3 fuel oils, used in heating and as diesel fuel oils, gasoline, turbine fuels and the jet combustion fuels, as previously indicated. The domestic fuel oils generally conform to the specifications set forth in ASTM Specification D396-4ST. Specifications for diesel fuels are defined in ASTM Specification D975-48T. Typical jet fuels are defined in Military Specification MIL-F-56243.

Other fields of specific applicability of the present invention are: solvents, as used with paints; spot removers such as naphtha cleaners; textile compositions; pigments; liquid polishes; rubber compositions and the like. In brief, the antistatic agents of this invention can be used with a composition susceptible of accumulating a static electrical charge or a composition susceptible of generation of such a charge. Thus, a static electrical charge accumulated by such a composition can be reduced by coating a surface of the composition with one or more of the novel antistatic agents. For example, a fabric or fibre can be surface treated with one or more of the agents to reduce the susceptibility of the fabric or fibre to accumulate a static electrical charge.

The composition of this invention, when added in concentrations of 1-100 ppm to fuel oils, increase the conductivity of the fuel substantially. Depending on the nature of the fuel and the structure of the specific nitrile copolymer the increases in conductivity will vary. However in all cases there is a substantial increase in the conductivity of the system.

In the examples, all conductivity measurements were made with a Maihak Conductivity Indicator (H. Maihak A.G. Hamburg, Germany). In the operation, the device imposes a potential of 6 volts of direct current on a pair of chromium plated electrodes immersed in the fluid to be treated. The current resulting from this potential, which is in the order of $10^{-9}$ to $10^{-8}$ ampere, is amplified and used to activate a dial calibrated in conductivity units. A conductivity unit is 1 picohm per meter.

The following examples are presented for purposes of illustration and not of limitation.

TABLE I

| | | Conductivity[1] (kerosene blank = 5 c.u.) | | |
|---|---|---|---|---|
| Ex. | Polymer | 1 ppm | 2 ppm | 3 ppm |
| 1 | Stearyl methacrylate-acrylonitrile | 150 | 300 | |
| 2 | Lauryl methacrylate-acrylonitrile | 190 | | |
| 3 | Lauryl methacrylate-acrylonitrile | | | 280[2] |
| 4 | Butyl methacrylate-acrylonitrile | 50 | | |

[1]1-1 wgt ratio blend of nitrile copolymer with polyamine from Example B5
[2]1-1 wgt ratio blend of nitrile copolymer and polyamine from Example B1

While specific examples of this invention have been presented herein, it is not intended to limit the invention solely thereto, but to include all variations and modifications within the spirit of the invention. Thus, the copolymers of this invention can be employed as an antistatic agent alone or in combination with other known antistatic agents or those agents which enhance, by synergism, the effects of antistatic agents.

I claim:

1. An antistatic composition for addition to organic fluids to reduce the electrostatic charges thereof comprising
(1) a copolymer of (a) a monomer of the formula

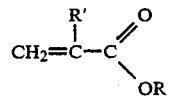

and (b) a monomer of the formula

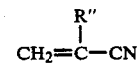

where R' and R", which may be the same or different, are hydrogen or an alkyl group and R is selected from the group consisting of alkyl, cycloalkyl, aryl and alkaryl; the molar ratio of (b) to (a) being from about 10:1 to 1:10; and the molecular weight of the copolymer being at least about 1000; and
(2) a polymeric polyamine selected from the group consisting of (i) the reaction product of an epihalohydrin and an amine and (ii) an α-olefin-maleimide copolymer.

2. The composition of claim 1 where the polymeric polyamine is the reaction product of an epihalohydrin and an amine.

3. The composition of claim 1 where the polymeric polyamine is an α-olefin-maleimide copolymer.

4. The composition of claim 3 where the α-olefin-maleimide is derived from a diamine.

5. The composition of claim 4 where the diamine has the formula NH₂A Ⓝ where A is alkylene and Ⓝ is a sterically hindered amino group.

6. The composition of claim 5 where the diamine is

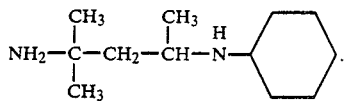

7. The composition of claim 1 where R' is methyl.
8. The composition of claim 2 where R' is methyl.
9. The composition of claim 3 where R' is methyl.
10. The composition of claim 4 where R' is methyl.
11. The composition of claim 5 where R' is methyl.
12. The composition of claim 6 where R' is methyl.

* * * * *